(12) United States Patent
Amann et al.

(10) Patent No.: US 6,625,176 B1
(45) Date of Patent: Sep. 23, 2003

(54) METHOD AND APPARATUS FOR ADJUSTMENT OF TIME DELAYS IN SYNCHRONOUS CLOCKED BUS SYSTEMS

(75) Inventors: Eberhard Amann, Rottenburg (DE); Helga Hermann, Leinfelden-Echterdingen (DE); Juergen Saalmueller, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/301,821

(22) Filed: Apr. 29, 1999

(30) Foreign Application Priority Data

Apr. 12, 1999 (DE) ............................................. 9910701

(51) Int. Cl.$^7$ ............................................. B41M 5/24
(52) U.S. Cl. ..................................................... 370/503
(58) Field of Search ................................. 370/503–516, 370/286–290, 335–342, 354, 278–280, 450, 392–396, 431, 254–259, 352, 517; 375/286–289, 111, 125–135, 354, 219, 342, 136, 366–368; 455/12.1, 427–428, 13.2, 67.6, 438, 442, 562, 500, 504; 252/354, 445, 480–489, 335–342, 324, 517; 347/133, 325–326, 354; 700/90, 63; 725/118–120, 232, 371, 350

(56) References Cited

U.S. PATENT DOCUMENTS

| | | | | |
|---|---|---|---|---|
| 5,544,155 A | * | 8/1996 | Lucas et al. | 370/342 |
| 5,684,791 A | * | 11/1997 | Raychaudhuri et al. | 370/278 |
| 6,091,932 A | * | 7/2000 | Langlais | 455/5.1 |
| 6,343,205 B1 | * | 1/2002 | Threadgill et al. | 455/12.1 |
| 6,353,604 B2 | * | 3/2002 | Grimwood et al. | 370/335 |
| 6,377,640 B2 | * | 4/2002 | Trans | 370/286 |
| 6,470,000 B1 | * | 10/2002 | Burns et al. | 370/342 |

* cited by examiner

Primary Examiner—Wellington Chin
Assistant Examiner—Prenell Jones
(74) Attorney, Agent, or Firm—John D. Flynn

(57) ABSTRACT

A method is provided to adjust time delays and sequence ordering of data channels in synchronous clocked bus systems. In particular, the invention relates to a method to re-synchronize data in respective channels which have a relative delay to each other caused by different path lengths, etc., on the way from sender to receiver. Still more specifically, the invention relates to an apparatus used to eliminate those delays in order to make data usable again on the receiver side. The method can be carried out using standard microprocessors without the need for special hardware implementations. Thus the use of costly and performance intensive ASICs and signal processors can be avoided.

35 Claims, 5 Drawing Sheets

METHOD AND APPARATUS FOR ADJUSTMENT OF TIME DELAYS IN SYNCHRONOUS CLOCKED BUS SYSTEMS

RELATED APPLICATIONS

The invention described here is related to those described in two applications filed on a common date herewith and held in common by the assignee of this invention. Those applications are identified as:

Method for Re-synchronizing a Group of B Channels in an ISDN Network, Ser. No. 09/301,987, filed Apr. 29, 1999; and Method for Re-synchronizing Channels Supporting an Inverse Multiplexing Function, Ser. No. 09/301,837, filed Apr. 12, 1999.

TECHNICAL FIELD

This invention relates to synchronous clocked bus systems like microprocessor busses, Local Area networks (LANs), Wide Area networks (WANs) or wireless communication networks that run several data channels on one or several wires or carriers where the data in the respective channels has a fixed correlation to each other by means of synchronous clocking. In particular, the invention relates to a method to re-synchronize data in respective channels which have a relative delay to each other caused by different path lengths, etc., on the way from sender to receiver. Still more specifically, the invention relates to an apparatus used to eliminate those delays in order to make data usable again on the receiver side.

BACKGROUND ART

Backbones for local area network (LAN) connections within large companies, as the connections between companies (as, for example, through the World Wide Web), are presently typically operated using proprietary, or leased, glass fiber networks with an ATM protocol. For the backup of dropped out connections or when an increase of bandwidth is necessary, additional bandwidth may be achieved by bundling together several digital telephone channels (Bearer channels) of the public switched network.

Using one Bearer channel (B channel), a bandwidth of 64 Kbit/s can be achieved. Typically, 24 (T1 standard) or 30 (E1 standard) of these channels are contained in a primary multiplexed line, providing a raw data rate of up to 2 Mbit/s when fully utilized.

It is, however, problematic that network suppliers can give no warranty that all of these B channels are synchronously run with respect to each other when using telephone channels of a public switched network for backup or increase of bandwidth purposes. While the entire telephone network may be operated by a synchronous clock, differences in transmit time among bundled channels can occur. The contents of the transmitted data packages (ATM frames) which are multiplexed in these channels may not reach the addressee in the original form because the different data packets will pass along different paths on their way from sender to receiver. In addition, there will be no warranty that the individual channels will follow a certain sequence (channel shuffling) when arriving at the addressee. This problem is also known from the field of picture telephony.

The inverse multiplexing function converts a wide-band communication on a high speed link into a group of combined switched channels. This function is very useful when using, e.g., 2 Mbit/s bandwidth on ISDN B channels of 56 or 64 Kbit/s. For instance, the European primary ISDN (Integrated Services Digital Network) provides 30 B channels for data and one channel for call control (D channel) while Basic Rate ISDN provides 2 B channels for data and also one D channel for control.

One problem in inverse multiplexing is being able to re-synchronize the channels in order to rebuild a high speed link on the remote (receiving) side of an established ISDN network link between two peer stations A and B. As the established link can be used in full duplex mode, this is true for both directions, i.e. the path A→B may have different characteristics compared to the path B→A. This requires that the inverse multiplexing must be performed symmetrically at each receiving station.

The BONDING™ (Bandwidth On Demand Interoperability Group—Trademark of the Bonding Consortium) specifications written by the BONDING consortium on Sep. 1, 1992 (and later releases) give some guidance to solving this problem. These specifications define a frame structure and procedures for establishing a wide-band communication connection by combining multiple switched 56 or 64 Kbit/s channels.

The BONDING specifications provide a high speed serial data stream by use of multiple, independent 56 or 64 Kbit/s channels. These channels are individually connected over a switched digital network (public, private, etc.). At the transmitting end, user data are distributed and transmitted over multiple independent B channels. The B channel is the network provided channel used to carry the data. At the receiving end, all channels are phase aligned and synchronized by use of an apparatus that makes data usable again on the receiver side. This apparatus hereinafter is referred to as an Inverse Multiplex Unit (IMU). It must be noted that the invention described hereinafter is not restricted to the IMU described herein but that all types of apparatus can be used which are able to eliminate the respective in the channels. The operation of such an IMU in the following will be described by a specific example related to the public switched network (ISDN). Again, it should be noted that this invention is not restricted to ISDN but can be used with any type of synchronous, time slot based network.

Because the channels used for the wide-band connection are routed through the network independently of each other, the data in each channel might be individually delayed relative to the data in other channels. Overall transit delay for the end-to-end connection is equal to the longest transit delay channel plus a constant delay due to the data reordering executed by the receiving IMU. To allow for correct realignment of the data transmitted, a training sequence is executed in advance of the channels being set-up to create the high speed link. A special framing pattern (synchronization pattern) is exchanged between both locations participating in the connection. The analysis of the pattern on the receiving side allows for exact calculation of respective delays between the B channels introduced by the switched network. Once aligned, data transfer can be constantly monitored throughout the call. The failure of a channel, for reasons such as call disconnection, phase slip or high error rate, can be automatically detected. Various fault isolation and recovery procedures are defined in response to these scenarios.

The BONDING specification describes four modes of operation:

BONDING Mode 0 provides initial parameter negotiation and Directory Number exchange over the master channel, then reverts to data transmission without delay equalization. This mode is useful when the calling endpoint requires Directory Numbers, but the delay equalization is performed by some other means (e.g., attached video codec).

BONDING Mode 1 supports user data rates that are multiples of the bearer rate. It provides the user with a data rate equal to the full available bandwidth, but does not provide an in-band monitoring function. The mode provides a solution for sending an initial set of frames, or so called training sequence, to synchronize (phase align) the sending of multiplexed data over the various channels of the group so as ensure the correct de-multiplexing of the high-speed data channel on the other side of the network. Error conditions on one or more channels that disturb overall system synchronization are not automatically recognized.

BONDING Modes 2 and 3 are each based on Mode 1 but with improvements for transmission quality. This is achieved by using data transfer frames having some bits dedicated to the storage of transmission control information that allows for transmission quality analysis and error recovery routines to be performed at the other side of the network. This is quite costly, however, as part of the bandwidth is being used for the transport of this control information. For Mode 2 the effective B channel rate is reduced by $1/64^{th}$. Mode 3 requires one additional B channel switched for control overhead.

BONDING Mode 1 is most popular in industry because of its simplicity as compared to Modes 2 and 3. The quality monitoring and failure recovery routines, unavailable with Mode 1, are typically performed at some upper layer of the application using the BONDING function. However, performing the above mentioned training sequence and the subsequent compensation of the data flow (sustained 2 Mbit/s) at the receiver or, because of full duplex mode, at both sides of the network connection, is a technical challenge. The training sequence must be performed each time a connection is set up, i.e., before each data transfer. Since each byte in the transmission must be processed, this approach can be very costly. The straight forward implementation is done using special ASICs or a number of signal processors.

In one of the aforementioned related applications, a method is provided for re-synchronizing a group of B channels in an ISDN network, using BONDING mode 1, which allows for re-synchronization without having to first disconnect the affected group of B channels. Thus, the reliability of the bonded channels is improved while maintaining a simpler system architecture as compared to the BONDING Mode 2 and 3 solutions. This method also has the advantage of tremendously reducing the time and network load required for achieving re-synchronization.

It is a purpose of the present invention to provide a method to perform the training sequence between two stations when establishing a network connection, and to provide for the rebuilding of data exactly in the same form as they are present at the transmitter in order to pass this information on to the high speed network.

It is another purpose of the present invention to provide an apparatus that is capable of carrying out this method.

It is still a further purpose of the present invention to provide such a method and apparatus which is functional, relatively inexpensive and has a minimum of required floor space.

SUMMARY OF THE INVENTION

The present invention provides a method which processes a training sequence between two stations when setting up a connection, calculates a compensation for relative delays between respective data channels and subsequently applies this compensation to the data that is passed.

In a special embodiment, the BONDING protocol is used with the IMU for the training sequence.

It is thus achieved that data is present, at the receiver at the output of the apparatus, in exactly the same form for passing on to a high speed (ATM) network as it has been dispatched at the sender.

As already mentioned above, a specifically advantageous embodiment of the present invention comprises the implementation of BONDING Mode 1. The invention will therefore be explained in more detail hereinafter on the basis of this mode. However, it is clear for the skilled worker that it is not restricted to this mode but can also be used with other suitable protocols.

DETAILED DESCRIPTION OF THE PREFERRED EMBODIMENT

Figure 1A:
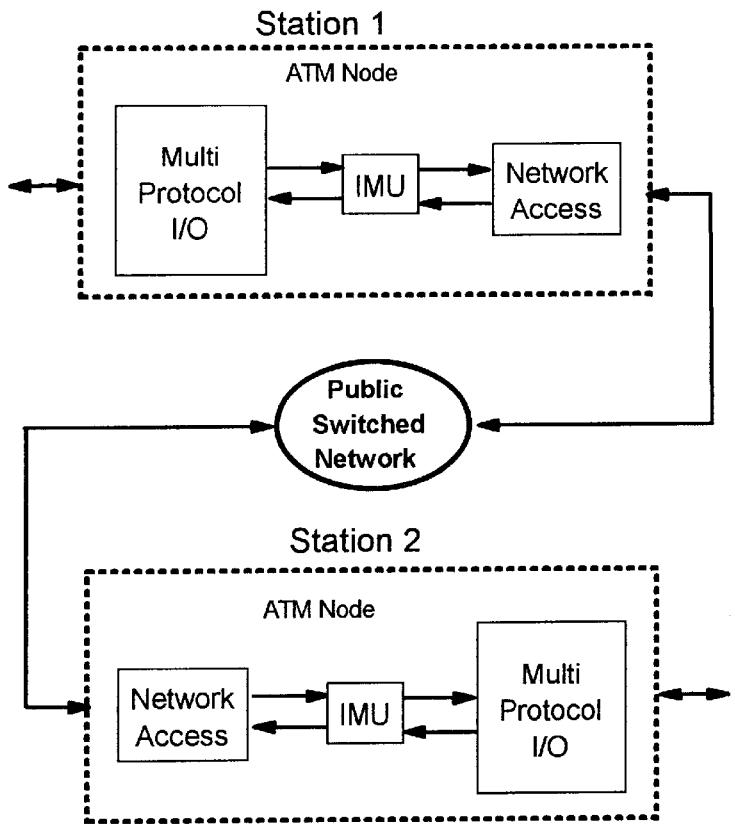
FIG. 1a schematically shows the implementation of the Inverse Multiplex Unit (IMU) in a user environment.
Figure 1B:
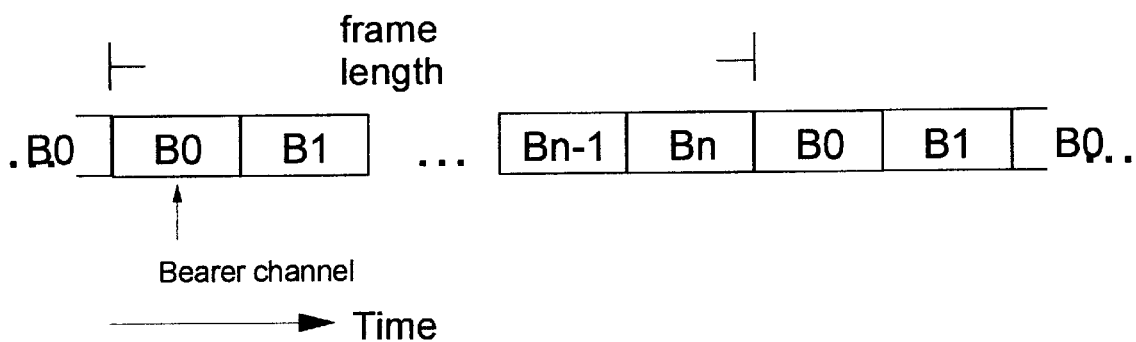
FIG. 1b depicts the Time Division Multiplex (TDM) format that is used in the Public switched network according to which the data stream is treated by the IMU.

As is shown in FIG. 1a the IMU is implemented in the network access hardware of an ATM node. While the back-end of the ATM node allows for connection of multi-protocol routing functions for attached end-user equipment based on ATM framing, the access to the switched network is done according to the CCITT (International Telegraph and Telephone Consultative Committee) recommendations. Data is transmitted full duplex through the Public Switched Network on time slot oriented frames. This Time Division Multiplex (TDM) format is shown in FIG. 1b. The B channels are arranged in a frame format that is continuously transmitted. So each frame contains one data octet of each B channel. The IMU function processes the data stream according to this time slot oriented frame format. The multiplexing/de-multiplexing of the TDM based data format to the framing format of the high speed network (e.g. ATM cells) is not within the scope of the IMU function.

Figure 2:
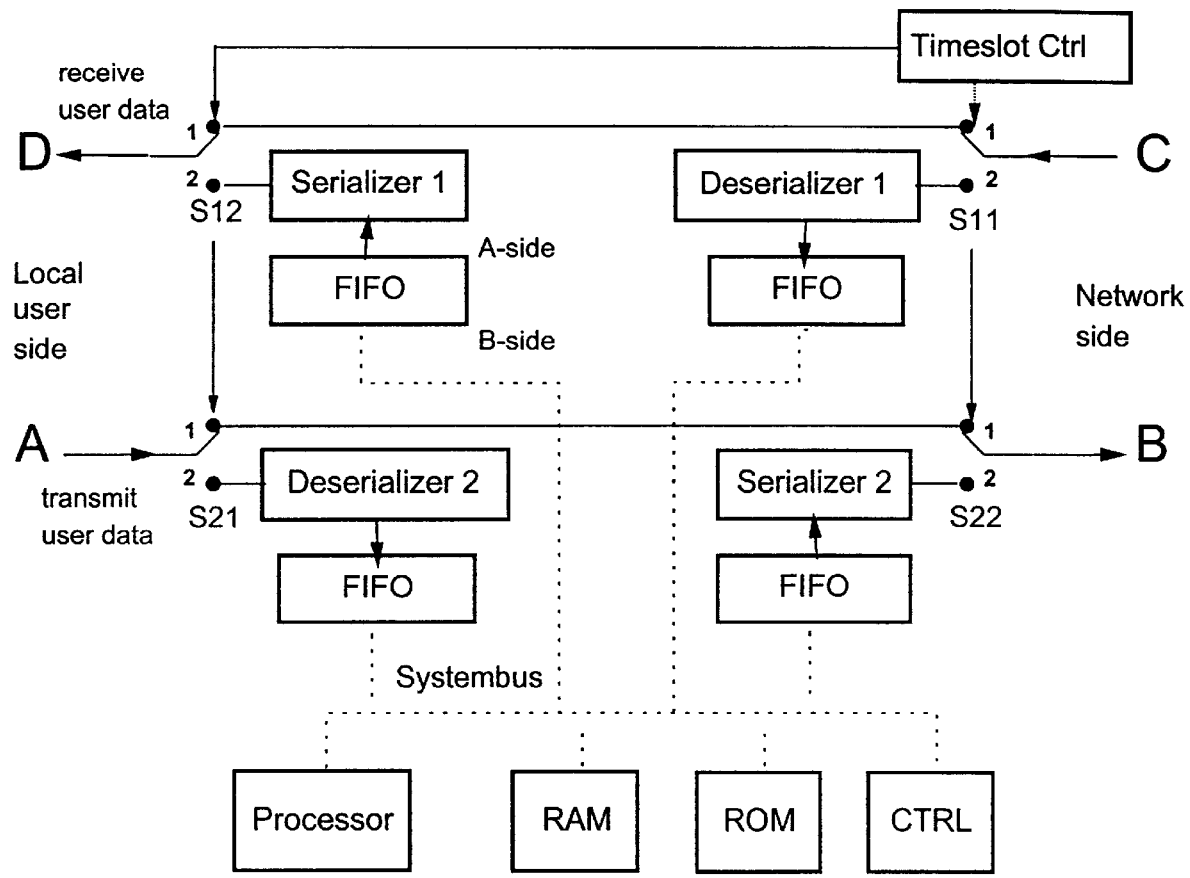
FIG. 2 shows the function of the IMU.

Referring now to FIG. 2, the function of an IMU is shown by illustrating the data paths which user data for different applications follows. The letters A, B, C and D indicate interface points between the IMU function and the local user (A, D on the left side of FIG. 2) as well as the switched network access (B, C on the right side of FIG. 2). In the event the IMU is used in a different environment, these interface points may consist of several wires of a bus system or interconnect to a demodulator stage of a wireless communication device.

The figure depicts a local user side which includes the transition to the high speed network (e.g. ATM)—where A is the transmit path for the user data from the high speed network to the IMU and D the opposite path—and the public switched network side—and where B is the transmit path to the remote peer IMU and C the receiving path from the peer IMU at the other end of the switched line (see FIG. 1a).

Electrically managed switches S11, S12, S21 and S22 control different data paths within the IMU.

Basically there are three different types of applications executed within the IMU depending whether a channel carries:

- raw user data that is not participating in a bonding group (e.g. voice data)
- data for the training sequence of a group the channel the forms part of, and
- user data that has to be reordered in the group the channel forms the part of.

For these different applications the data paths within the IMU are as follows:

a) B channels which are not participating in a BONDING group (e.g. in a typical phone line, those whose B channel data has to be passed through the IMU without any manipulation). The data of those channels is directly transferred from A to B and C to D by the time slot synchronized switching of switches S21, S22 and S11, S12 into position 1 as shown in FIG. 2. The control of these switches runs synchronously to the framing clock of the switched network.

b) Channels which participate in a BONDING group during the training phase. (In this phase a synchronization pattern has to be sent out to the remote station while in the same turn a pattern has to be received locally by the IMU from the remote station).

In this case, switch S11 is in position 2 to receive the synchronization pattern (see below) on interface C from the remote station in De-serializer 1. Switch S22 is in position 2 and Serializer 2 transmits the synchronization pattern out of the RAM storage at interface B to the remote station. According to the BONDING specification, this is the common procedure for Modes 1–3. The user data path is blocked at interface A and D for this channel until training has been completed.

c) Channels which participate in a BONDING group after completion of the training phase, transmitting user data synchronously distributed in all channels participating in this group. (User data is transmitted transparently to the remote peer in the respective channel while data received from remote peer must be reordered and therefore all data of the respective channel have to be processed by the IMU).

While transmitting in BONDING mode 0, all four switches S11, S12, S21 and S22 are held in position 1 for the respective time slots. User data is passed from A to B and then from C to D without any change in direction.

While transmitting in BONDING mode 1, two switches, S21 and S22, are held in position 1 for the respective time slots such that the user data is transmitted from interface A to B and further to the remote station without any change.

While transmitting in BONDING Modes 2 and 3, the two switches S21 and S22 are held in position 2 for the respective time slots. Local user data from interface A is routed through De-serializer 2 and the system control function executed by the processor adds synchronization patterns to the user data stream. By use of Serializer 2, the data is routed to the remote peer at interface B.

While receiving in BONDING Modes 1–3, two switches S11 and S12 are held in position 2 for the respective time slots. The data received from the remote side through interface C is transferred through De-serializer 1 into the RAM storage. The processor shifts and reorders the data streams for the respective channels according to the synchronization information, represented in the so called α-Table and Δ-Table. The Δ-Table is initialized during the training phase and contains the delays for all channels. The α-Table is updated at the time the connection is set up for all those channels which participate in a BONDING group and contains the reorder information to get the channels at receiving side again in a sequence similar to that on the transmit side.

The Δ-Table provides the address shift (i.e., the number of frames) for the respective channel, by which the data element has to be shifted. This corresponds to a time offset. In addition, a rearrangement of the channel is carried out using the values of the α-Table, by incrementing or decrementing the address shift by a special area within a frame, corresponding to a local offset.

The α-Table comprises the difference between the channel number on the transmitting side and the respective channel number on the receiving side.

The re-synchronized data is shifted out to the local user side by use of the Serializer 1 at interface D. This reordering of the user data runs synchronously to the network clock, so that the IMU function can be implemented transparently on any type of TDM bus (e.g., E1, T1 framing).

Figure 3:
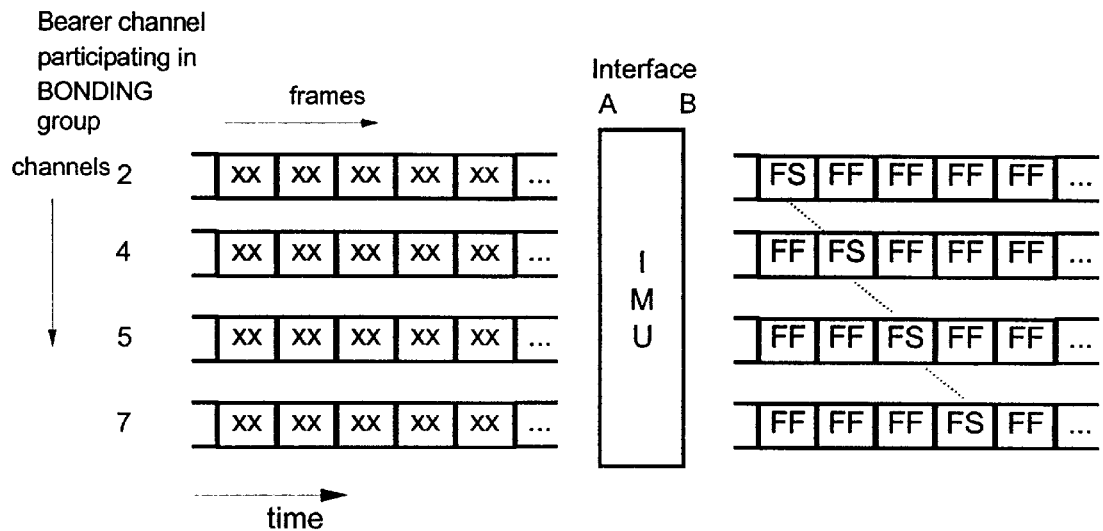
FIGS. 3 to 5 show the training sequence and the creation of the α-Table and Δ-Table.
Figure 4:
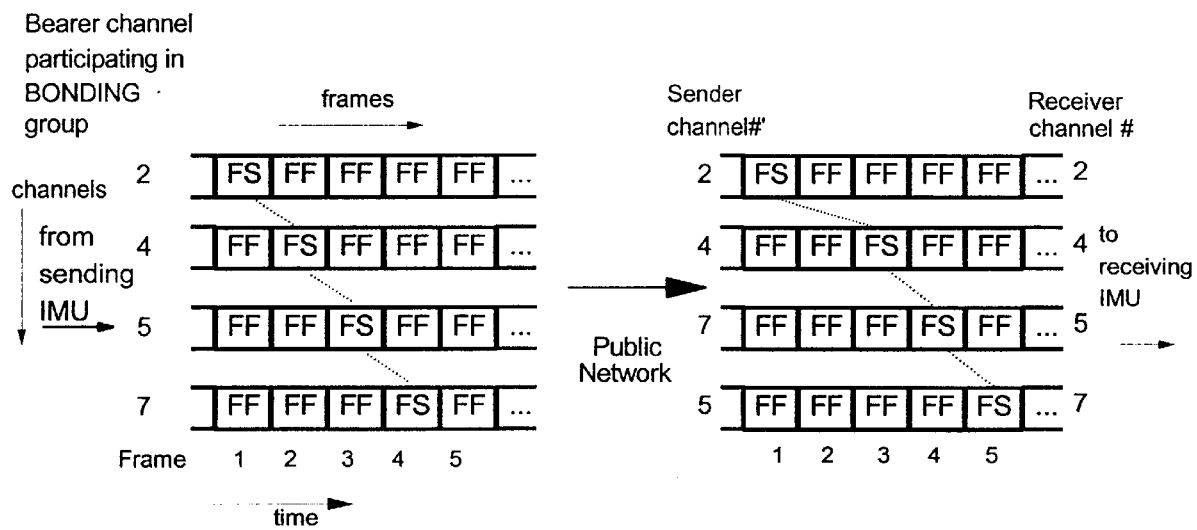
Figure 5:
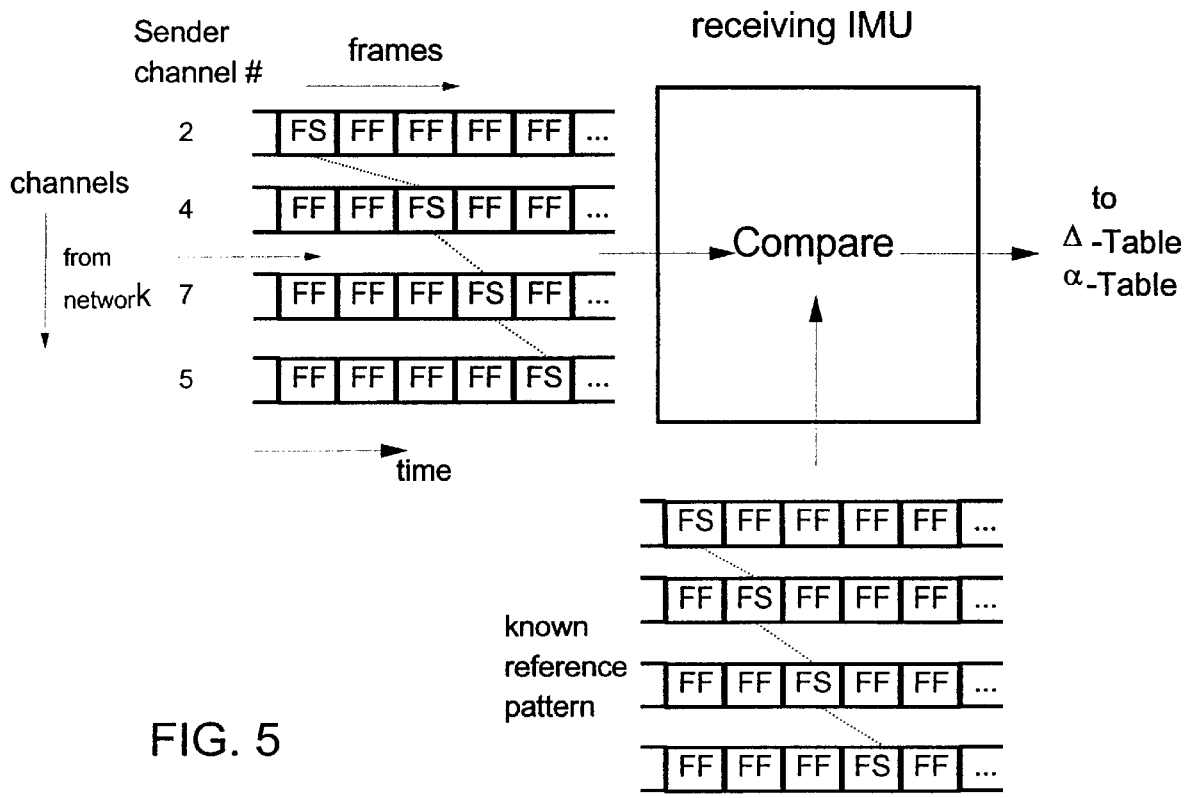

FIGS. 3 to 5 schematically describe the training phase and the creation of the respective α and Δ Tables.

During the training phase, a synchronization pattern (super-frame according to the BONDING specification, see BONDING specification for exact layout) is generated on each of both IMUs participating in the connection for the respective channels of the BONDING group to be established. This pattern is sent out mutually to the other station after the link is switched through. FIG. 3 shows this state for one of the two IMUs for several frames (in this example the B channels 2, 4, 5 and 7 participate in a BONDING group, the generation of 5 consecutive frames is shown, where according to the definition given in the BONDING specification, FS=Frame Synchronization octet pattern, FF=Idle octet pattern with all bits set, xx=user data that is not recognized during training phase). On its path through the switched network to the remote station, the B channel assignment to the data stream may change its ordering (in FIG. 4, right side, e.g. channels 5 and 7 are swapped) and the data in the Bearer channels is shifted against each other due to different path lengths of the switched B channels through the network.

On the receiving side, this shifting is detected by checking the FS pattern in the frames received and determining it to be in a different frame position as compared to the pattern sent (cf. FIG. 5, continued from FIG. 4, taking channel 2 as a reference, channel 4 is delayed by 1 frame, channel 5 is delayed by 2 frames and channel 7 is in sync, channels 5 and 7 still being swapped).

The shift of synchronous patterns in the B channels is calculated on the receiving side for the group currently in the training phase and stored in the Δ-Table, which, as already mentioned above, contains the delays for all channels of a TDM bus to support. The change of order of channels on the receiving side (in the example channels 5 and 7) is indicated by the call control function during link establishment. The reassignments required for reordering are stored in the α-Table for the respective group. The α-Table also encloses all channels of a TDM bus to support.

For the example given in FIG. 3–5, the Δ-Table would contain a shift of one (frame) for channel 4 and two frames for receiving channel 7 (respective sending channel 5). The α-Table would contain 2 for channel 5 because it was rerouted by the network from channel 7 on receiving side and −2 for channel 7 due to its rerouting from channel 5. The basic meaning of the α-Table is to reorder the channel number sequence on the receiving side to the exact same sequence as that on the sending side.

It should be obvious to one skilled in the art that on the one hand, any rerouting of a sending channel to a receiving channel through the network is possible, and on the other hand can be recovered by the α-Table.

Re-synchronization of Received Data

Figure 6:
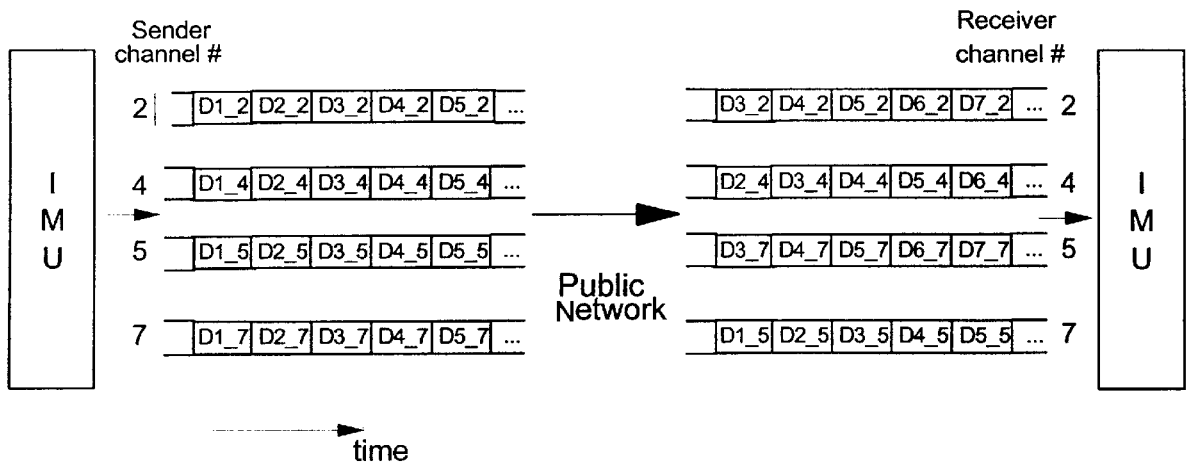
FIG. 6 depicts a part of the data stream of a BONDING group sent from one station to another after completion of the training phase.

FIG. 6 shows a part of the data stream of a BONDING group that is sent from station 1 to station 2 (cf. FIG. 1a) after completion of the training phase (in the example, i.e., D2_4=data octet of a frame 2 in channel 4, and BONDING Mode 1 is used, for BONDING Modes 2 and 3, synchronization patterns are added by the sending IMU function). The data is received by the other station at interface C (cf. FIG. 2) in the same disordered way as before in the training sequence.

Figure 7:
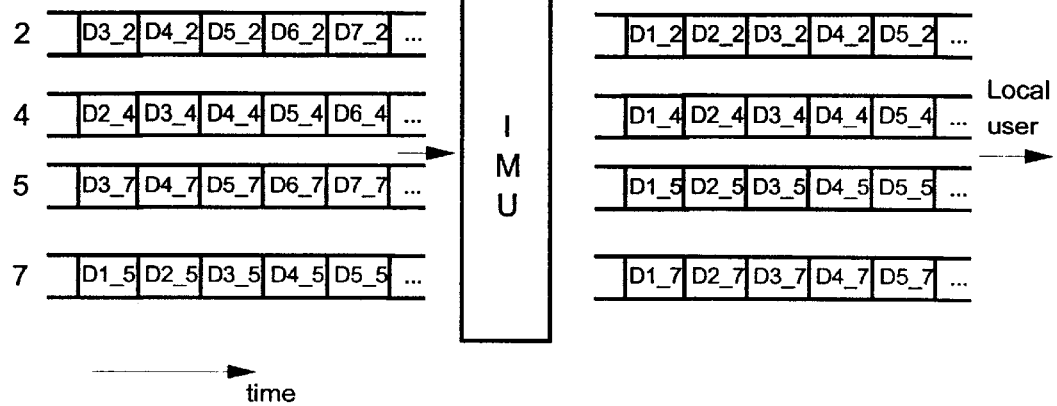
FIG. 7 schematically shows how, according to the invention, the disordered data is received by the IMU and recovered using the α-Table and Δ-Table.

The receiving part of the IMU function (FIG. 7) recovers the disordered data according to the values stored in the α and Δ tables and makes the values available for the local user side at interface D (cf. FIG. 2).

Figure 8:
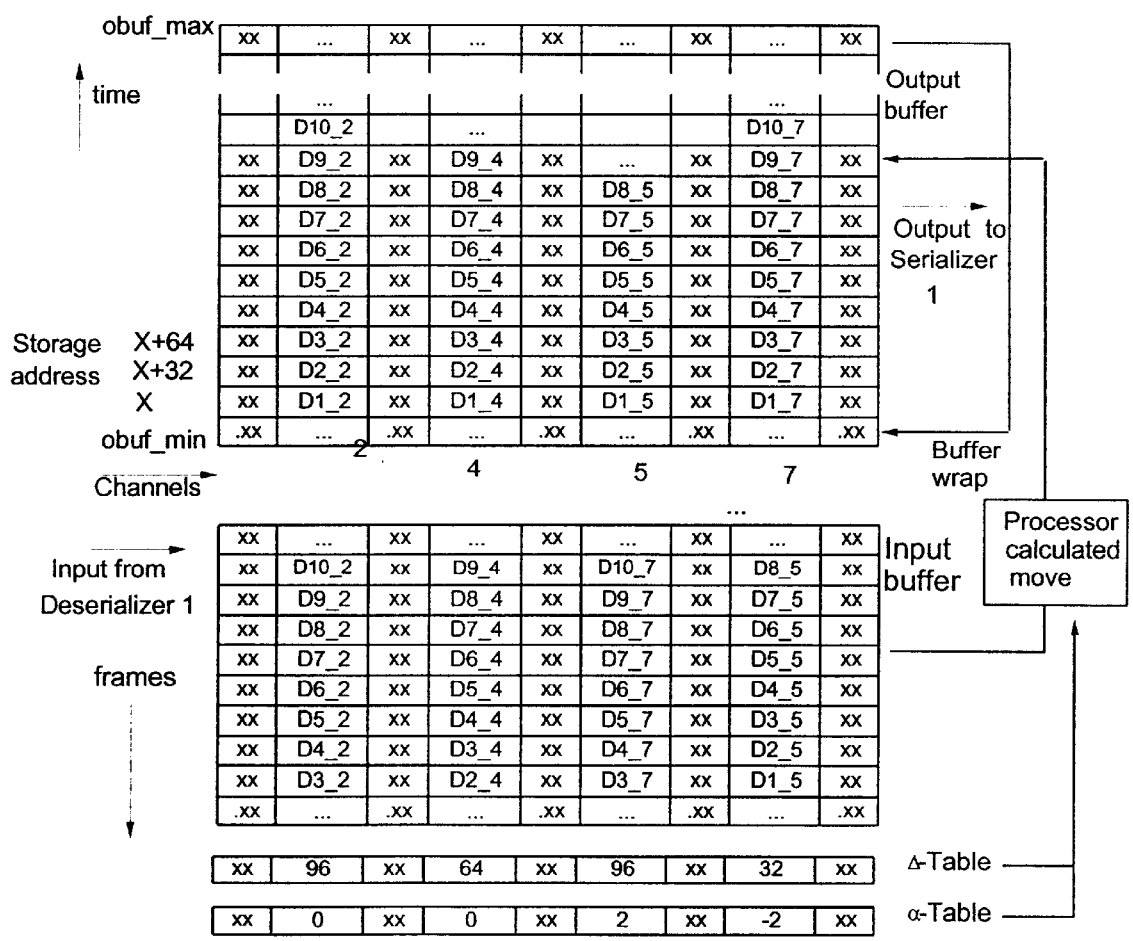
FIG. 8 is a more detailed view of the reordering process of FIG. 7.

This reordering process is shown in more detail in FIG. 8. Received data from the network side (interface C, cf. FIG. 2) is de-serialized and stored in the input buffer located in the RAM storage, still being in the disordered way as in the training sequence. The data is then moved by a processor calculated move (see below) to the output buffer located in the RAM storage. One data octet has to get moved by the time due to the specific attributes for each channel of shifting and reordering. The target address of this move is calculated out of the received frame number and from the contents of the α and Δ tables, i.e. in the output buffer the data of the channels is already ordered in correct relation to each other so they can be sent out by the serializer to the local user side at interface D.

It is the special layout of input and output buffer together with the format of information stored in the α and Δ tables that allows for the reduction in reordering of channels and compensation of delays by one single move of the respective data octet from input to output buffer.

Input and output buffers have to be considered as an array that is ordered as channels of the TDM bus in one dimension and data frames transmitted in these channels in the other (e.g. for the E1 format 32 channels will be used, best efficiency of the algorithm is always achieved if the dimension for the channels is rounded up to a power of 2 even if some channels are not used, e.g. T1 framing). The input buffer may be organized in two halves that are used alternatively for read-in data from De-serializer 1 and data moved to the output buffer. The output buffer may be used as a wrapping buffer, i.e. if the buffer is filled up to the highest addressable location at obuf_max (cf. FIG. 8), address pointers that reach this value or higher are initialized with offset to obuf_min (cf. FIG. 8) instead of obuf_max. Previously used data stored at those locations may be overwritten.

Looking at the received data in the way presented in FIG. 8, the columns show the data stream in a respective channel. To move data back in the time domain (e.g. introduce an artificial delay to compensate a time difference against another channel that runs a longer path) the data in the column simply has to get shifted up. On the move from input to output buffer, an increment in the address to store by the length of one row will delay the data in the respective channel by one frame. Larger delays are generated by multiple increments of row length. The maximum recoverable delay depends on the size of the output buffer and can be improved simply by increasing the RAM storage resulting in a solution easy to scale in regards to number of channels to be supported as well as the maximum delay.

In each row the same frame data is located with the channels one next to the other. The move of a data octet within the row would change the channel number and therefore allows for reordering the channel sequence. The α-Table contains the difference for the channel to be reordered. On the move from input to output buffer, an increment by 1 in the address to store given by the α-Table will move all data from channel n to n+1 while a decrement by 1 would reorder from n to n−1.

FIG. 8 shows the reordering and shifting of user data according to the α and Δ table given from FIG. 5 for the four Bearer channels. Channels and frames are arranged in a two-dimensional array.

The example is based on E1 framing, i.e. 32 channels per row. Also the α and Δ tables show a length of 32 entries. While the α-Table contains the true difference in channel number, the address calculation can be greatly improved if in the Δ-Table, not only the delay in frames is stored but rather the delay in number of rows which is the product of row length and the delay in number of frames to compensate is stored. In the example given, the row length calculates 32 (E1 framing). As a reference for delay compensation in a BONDING group, the channel with maximum delay against all others should be used (this allows for positive address calculation and avoids more complicated subtract operation)—in the example it is the received channel 7. Measured against this channel, the channels 2 and 5 are 2 frames ahead, while channel 4 is one frame ahead. In the Δ-Table one would write an offset of 64 for channels 2 and 5 and an offset of 32 for channel 4. To avoid negative offsets due to the channel reordering out of the α-Table, one may simply add to all channels a basic offset of 32.

The correct storage locations for the data movement from input to output buffer at basic row address X then reads X+96 for channel 2, X+64 for channel 4, X+96 for channel 5 while doing a reordering to channel 7 and X+32 for channel 7 while doing a reordering to channel 5.

Due to the reduction of shift and reordering to a simple address calculation, the task needs only the processor calculated move mentioned above which means a processor performance of one load instruction per data octet and an indirect store instruction with calculated address offset is required. Accordingly, the total shift of an address can be combined in a special offset value by using both the α-Table and the Δ-Table values. Thus no special hardware is required and a standard microprocessor can be used. The overall handling described above for reordering of the received data shows very basic improvements as compared to a straight-forward implementation with signal processors that move data from input to output buffer handling one channel at a time by use of delay loops or equivalent solutions requiring high speed RAM storage and tentatively several processors to synchronize. An ASIC solution with several programmable First In First Out (FIFO) shift chains embedded is also much more complicated, is not as flexible and is more expensive than the solution shown above.

The procedures described above have to be applied to all data received in BONDING Modes 1–3. In the case of Modes 2 and 3 the cyclic frame synchronization pattern has to be removed out of the user data stream, as according to the algorithm, these patterns have been put in the data stream on the transmit side. This operation is also done in the processor calculated move from input to output buffer and requires an additional address offset.

The above described method allows for providing data at the receiver at the output of an IMU function which has exactly the same format as sent by the sender for transmitting to an ATM network or any other high speed network or data processing unit.

What is claimed is:

1. A method comprising:
   performing a training sequence between two devices while establishing a connection there between for the exchange of data through a plurality of data channels in a synchronous clocked bus system;
   determining a time delay value for each data channel, the time delay values being representative of the relative path delay of the data channels through the synchronous clocked bus system;
   determining a channel sequence offset for each data channel, the channel sequence offset representing the difference between a channel number assigned to a transmitter and a channel number assigned on a receiver;
   forming an address offset for each data channel using the time delay value and the channel sequence offset; and
   reordering the data received from each of the data channels using the address offset formed for each data channel.

2. A method according to claim 1, wherein the synchronous clocked bus system is a microprocessor type bus system.

3. A method according to claim 1, wherein the synchronous clocked bus system is implemented in a wireless communication system.

4. A method according to claim 1, wherein the synchronous clocked bus system is implemented in a public switched network.

5. A method according to claim 1, wherein the step of establishing connection comprises using BONDING mode 1.

6. A method according to claim 1, further comprising:
   storing the channel sequence offsets for the plurality of data channels in a first table and the time delay values for the plurality of data channels in a second table.

7. A method according to claim 1, wherein the step of reordering data on a received channel is carried out by a processor executed calculated move.

8. A method according to claim 7, wherein the step of reordering is carried out in an application specific integrated circuit (ASIC) device.

9. A method according to claim 7, wherein the step of reordering is carried out by receiving data into an input buffer and the processor calculated move is carried out using the contents of the input buffer together with the address offset.

10. A method according to claim 9, wherein the step of reordering further comprises writing the data to an output buffer.

11. A method according to claim 10, further comprising providing data present in the output buffer to a local user.

12. A method according to claim 9, further comprising alternatively using two halves of an input buffer for reading in data and for moving data to an output buffer.

13. A method according to claim 10, wherein the output buffer is a wrapping buffer.

14. A method according to claim 6, wherein said tables have a length of entries that is based on a power of 2, especially 32.

15. A method according to claim 12, wherein received data is stored in the first half of the input buffer and wherein simultaneously the data stored in the second half of the input buffer is transferred to the output buffer.

16. A method according to claim 1, further comprising avoiding an occurrence of a negative offset by adding a basic offset to all available channels.

17. An Apparatus according to claim 1, wherein said network is a switched network.

18. An Apparatus according to claim 1, wherein said input buffer and said output buffer represent a two-dimensional array providing data channels in one dimension and data frames transmitted in said data channels in the other dimension.

19. An Apparatus according to claim 1, wherein said input buffer is separated into two halves.

20. An Apparatus according to claim 1, wherein said output buffer is a cyclic buffer.

21. An apparatus comprising:
    an input buffer for storing data received from a plurality of data channels of a synchronous time slot based network;
    an output buffer;
    a first table having a channel sequence offset for each of the plurality of data channels, the channel sequence offset representing the difference between a channel number assigned to a transmitter and a channel number assigned to a receiver;
    a second table having a time delay value for each of the plurality of data channels, the time delay values being representative of the relative path delay of the data channels through the synchronous time slot based network; and
    a processor for forming an address offset for each data channel using the time delay value and the channel sequence offset associated with the data channel, and transferring data received into the input buffer to the output buffer using the address offset for each channel such that output buffer contains data in the same sequence as that provided to the network by the transmitter.

22. The apparatus according to claim 21, wherein in said processor transfers data received from each time slot of each data channel using a single load instruction.

23. A method according to claim 1, further comprising:
    adjusting the address offset for each data channel when the time delay value or channel sequence offset changes.

24. An article of manufacture comprising a processor useable medium having a processor readable program embodied in said medium, wherein the processor readable program when executed causes the processor to:
    perform a training sequence between two devices while establishing a connection there between for the exchange of data through a plurality of data channels in a synchronous clocked bus system;
    determine a time delay value for each data channel, the time delay values being representative of the relative path delay of the data channels through the synchronous clocked bus system;

determine a channel sequence offset for each data channel, the channel sequence offset representing the difference between a channel number assigned to a transmitter and a channel number assigned on a receiver;

form an address offset for each data channel using the time delay value and the channel sequence offset; and reorder the data received from each of the data channels using the address offset formed for each data channel.

25. The article of manufacture of claim 24, wherein the connection is established using BONDING mode 1.

26. The article of manufacture of claim 24, further including causing the processor to:

store the channel sequence offsets for the plurality of data channels in a first table and the time delay values for the plurality of data channels in a second table.

27. The article of manufacture of claim 24, wherein the data is reordered on a received channel by causing the processor to execute a calculated move.

28. The article of manufacture of claim 27, wherein the data is reordered by receiving data into an input buffer and the processor calculated move is carried out using the contents of the input buffer together with the address offset.

29. The article of manufacture of claim 28, further including causing the processor to:

write the data to an output buffer.

30. The article of manufacture of claim 29, further including causing the processor to:

provide the data present in the output buffer to a local user.

31. The article of manufacture of claim 28, further including causing the processor to:

alternate using two halves of an input buffer for reading in data and for moving data to an output buffer.

32. The article of manufacture of claim 29, wherein the output buffer is a wrapping buffer.

33. The article of manufacture of claim 26, wherein said tables have a length of entries that is based on a power of 2, especially 32.

34. The article of manufacture of claim 31, wherein received data is stored in the first half of the input buffer and wherein simultaneously the data stored in the second half of the input buffer is transferred to the output buffer.

35. The article of manufacture of claim 24, further including causing the processor to:

avoid an occurrence of a negative offset by adding a basic offset to all available channels.

* * * * *